United States Patent
Eling

(10) Patent No.: US 6,346,204 B1
(45) Date of Patent: Feb. 12, 2002

(54) PROCESS FOR PREPARING RIGID AND FLEXIBLE POLYURETHANE FOAMS

(75) Inventor: Berend Eling, Bertem (BE)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 09/663,385

(22) Filed: Sep. 15, 2000

Related U.S. Application Data

(62) Division of application No. 08/963,744, filed on Nov. 4, 1997, now Pat. No. 6,147,134.

(30) Foreign Application Priority Data

Nov. 8, 1996 (EP) .............................. 96203134

(51) Int. Cl.[7] .................................. C09K 3/00
(52) U.S. Cl. .............................. 252/182.24; 252/182.27
(58) Field of Search ........................ 252/182.24, 182.27

(56) References Cited

U.S. PATENT DOCUMENTS

| 4,454,248 A | 6/1984 | Pollock et al. |
| 5,519,068 A | 5/1996 | Okada et al. |
| 5,552,450 A | 9/1996 | Minz et al. |
| 5,688,835 A | 11/1997 | Scherbel et al. |
| 5,698,601 A | 12/1997 | Welte et al. |
| 5,900,442 A | 5/1999 | Leenslag et al. |

FOREIGN PATENT DOCUMENTS

| DE | 44 18 507 | 11/1995 |
| EP | 567 027 | 10/1993 |
| GB | 2 099 440 | 12/1982 |
| WO | WO 96/35744 | 11/1996 |

*Primary Examiner*—John M. Cooney, Jr.
(74) *Attorney, Agent, or Firm*—Pillsbury Winthrop LLP

(57) ABSTRACT

Process for preparing a rigid and a flexible polyurethane foam by reacting a polyisocyanate and two different polyols under foam forming conditions, the polyisocyanate being reacted with said polyols in the absence of compounds comprising primary, secondary or tertiary amines. Flexible foams are obtained which do not show a major glass transition temperature between −100° C. and +25° C.

14 Claims, No Drawings

PROCESS FOR PREPARING RIGID AND FLEXIBLE POLYURETHANE FOAMS

This is a division of application Ser. No. 08/963,744, filed Nov. 4, 1997 which is now U.S. Pat. No. 6,147,134.

The present invention is concerned with a process to prepare rigid and flexible polyurethane foams.

Conventional flexible polyurethane foams are widely known. Such foams show a relatively high resilience (ball rebound), a relatively low modulus, a relatively high sag factor and a relatively low hysteresis loss. Such foams further show a major glass-rubber transition below ambient temperature, generally in the temperature range of $-100°$ C. to $-10°$ C. The commonly applied relatively high molecular weight polyether and polyester polyols in such foams are responsible for the sub-ambient glass transition temperature ($Tg^s$) These polyether and polyester polyols are often referred to as soft segments. Above $Tg^s$ the foam displays its typical flexible properties until softening and/or melting of the isocyanate-derived urethane/urea clusters ("hard domains") takes place. This softening and/or melting temperature ($Tg^h$ and /or $Tm^h$) often coincides with the onset of thermal degradation of polymer segments. The $Tg^h$ and/or $Tm^h$ for flexible polyurethane foams is generally higher than $100°$ C., often even exceeding $200°$ C. At the $Tg^s$ a sharp decrease of the modulus of the flexible foam is observed. Between $Tg^s$ and $Tg^h/Tm^h$ the modulus remains fairly constant with increasing temperature and at $Tg^h/Tm^h$ again a substantial decrease of the modulus may take place. A way of expressing the presence of $Tg^s$ is to. determine the ratio of the Young's storage modulus E' at $-100°$ C. and $+25°$ C. as per Dynamic Mechanical Thermal Analysis (DMTA measured according to ISO/DIS 6721-5). For conventional flexible polyurethane foams the $$\frac{E' - 100° C.}{E' + 25° C.} \text{ ratio is at least 25.}$$

Another feature of $Tg^s$ by DMTA (ISO/DIS 6721-5) is that for conventional flexible polyurethane foams the maximum value of the $$\frac{\text{Young's loss modulus } E''}{\text{Young's storage modulus } E'} (\tan_{\delta max.})$$

$-100°$ C./$+25°$ C. temperature range varies from 0.20–0.80 in general. The Young's loss modulus E" is measured by DMTA (ISO/DIS 6721-5) as well.

Conventional flexible foams are made by reacting a polyisocyanate and a relatively high molecular weight isocyanate reactive polymer, often a polyester or polyether polyol, in the presence of a blowing agent and optionally further using limited amounts of relatively low molecular weight chain extenders and cross-linkers and optionally using additives like catalysts, surfactants, fire retardants, stabilisers and antioxidants. The relatively high molecular weight isocyanate reactive polymer in general represents the highest weight fraction of the foam. Such flexible foams may be prepared according to the one-shot, the quasi- or semi-prepolymer or the prepolymer process. Such flexible foams may be moulded foams or slabstock foams and may be used as cushioning material in furniture and automotive seating and in mattresses, as carpet backing, as hydrophilic foam in diapers and as packaging foam. Further they may be used for acoustic applications, e.g. sound insulation. Examples of prior art for these conventional flexible foams are EP-10850, EP-22617, EP- 11 121, EP-296449, EP-309217, EP-309218, EP-392788 and EP-442631.

Conventional rigid foams are made in a similar way with the proviso that often the polyisocyanates have a higher isocyanate functionality, the amount of high molecular weight polyols used is lower and the amount and functionality of the cross-linkers is higher.

WO92/12197 discloses an energy-absorbing, open-celled, water-blown, rigid polyurethane foam obtained by reacting a polyurethane foam formulation, comprising water which acts as a blowing agent and a cell-opener, in a mould wherein the cured foam has a moulded density of about 32 to 72 kg/m³ and a crush strength which remains constant from 10 to 70% deflection at loads of less than 70 psi. The foams have minimal spring back or hysteresis.

GB2096616 discloses a directionally flexibilized, rigid, closed-cell plastic foam. The rigid foams are flexibilized in order to use them for e.g. pipe-insulation. Cells should remain closed.

U.S. Pat. No. 4299883 discloses a sound-absorbent material made by compressing a foam having closed cells to such an extent that the foam recovers to 50–66% of its original thickness. By the compression the cells are ruptured and the foam becomes flexible and resilient; it may replace felt. The disclosure mainly refers to polycarbodiimide foams.

EP561216 discloses the preparation of foam boards having improved heat insulation properties, wherein the foam has anisotropic cells having a length ratio of the long and the small axis of 1.2–1.6 and a density of 15–45 kg/m³ and wherein the cells have been crushed in the direction of the plate thickness. The disclosure actually refers to polystyrene boards.

EP641635 discloses a process for preparing foam boards, having a dynamic stiffness of at most 10 MN/m³, by crushing a board of 17–30 kg/m³ density at least twice to 60–90% of its original thickness. Preferably closed-celled polystyrene is used. In the examples it is shown that a polystyrene foam which has been crushed showed a better heat insulation than an uncrushed one.

U.S. Pat. No. 4454248 discloses a process for preparing a rigid polyurethane foam wherein a partially cured rigid foam is softened, then crushed and re-expanded and fully cured.

In copending patent application PCT/EP9601594 a class of flexible polyurethane foams is described such foams having no major glass-rubber transition between $-100°$ C. and $+25°$ C. In more quantitative terms these foams show a ratio $E'_{-100}°$ C./$E'_{+25}°$ C. of 1.3 to 15.0, preferably of 1.5 to 10 and most preferably of 1.5 to 7.5. The $\tan_{\delta max}$ over the $-100°$ C. to $+25°$ C. temperature range is below 0.2. The core density of such foams may range from 4–30 kg/m³ and preferably ranges from 4–20 kg/m³ (measured according to ISO/DIS845). Such foams are made by crushing a rigid foam.

The present invention is concerned with a process for preparing rigid polyurethane foams by reacting a polyisocyanate (1), a polyether polyol (2) having a hydroxyl number of at least 150 mg KOH/g and an average nominal hydroxyl functionality of from 2 to 8, a polyether polyol (3) having a hydroxyl number of from 10 to less than 150 mg KOH/g and an average nominal hydroxyl functionality of from 2 to 6 and water wherein the amount of polyisocyanate (1), polyol (2), polyol (3) and water is 55–80, 3–20, 10–30 and 2–6 parts by weight respectively per 100 parts by weight of polyisocyanate (1), polyol (2), polyol (3) and water and wherein the reaction is conducted at an isocyanate index of 102–200 and preferably of 102–150 and wherein the polyisocyanate is reacted with one or more isocyanate-reactive compositions comprising one or more of the aforementioned polyol (2), polyol (3) and water and not comprising compounds which have a primary, secondary or tertiary nitrogen atom.

The improved process gives foams with reduced thermal degradation, especially when such foams are made as large buns e.g. on a moving conveyor belt (slab-stock foam), the foams have improved stability and a lower amount of extractables.

The present invention is more in particular concerned with a process for preparing a rigid foam by reacting a polyisocyanate (1), a polyether polyol (2) having an average equivalent weight of 70–300 and preferably of 70–150, having an average nominal hydroxyl functionality of from 2 to 6 and preferably from 2 to 3 and oxyethylene content of at least 75% by weight, a polyether polyol (3) having an average equivalent weight of 1000–3000, having an average nominal hydroxyl functionality of 2 to 3 and preferably of 2 and having the structure

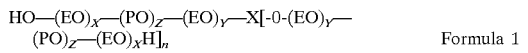

HO—(EO)$_X$—(PO)$_Z$—(EO)$_Y$—X[-0-(EO)$_Y$—(PO)$_Z$—(EO)$_X$H]$_n$     Formula 1 wherein EO is an ethylene oxide radical, PO is a propylene oxide radical, x=1–15 and preferably 3–10, y=0–6 and preferably 1–4, z is such so as to arrive at the above equivalent weight, n=1–2 and X is a hydrocarbon radical having 2–10 and preferably 2–6 carbon atoms or a radical having the formula —CH$_2$—CH$_2$—(OCH$_2$—CH$_2$)$_{1-2}$—, and water wherein the amount of polyisocyanate (1), polyol (2), polyol (3) and water is 55–80, 3–20, 10–30 and 2–6 parts by weight respectively per 100 parts by weight of polyisocyanate (1), polyol (2), polyol (3) and water and wherein the reaction is conducted at an isocyanate index of 102–200 and preferably of 102–150 and wherein the polyisocyanate is reacted with one or more isocyanate-reactive compositions comprising one or more of the aforementioned polyol (2), polyol (3) and water and not comprising compounds which have a primary, secondary or tertiary nitrogen atom.

Preferably the amount of water is 3–5 parts by weight calculated on the same basis as above. Preferably the weight ratio of water and polyol (3) is 0.1 to 0.4:1 and the weight ratio of polyol (3) and of polyol (2) +water is 0.9–2.5:1. The core density of the rigid foams obtained is preferably 3–15 kg/M$^3$ (ISO 845).

Further the present invention is concerned with the rigid foams so obtainable, with a process for preparing a flexible foam by crushing a rigid foam so obtained, with flexible foams so obtainable, with reaction systems comprising the ingredients for making these foams and with polyol compositions comprising the aforementioned polyether polyol (2), polyether polyol (3) and water in an amount of 15–40, 45–75 and 5–20 parts by weight respectively per 100 parts by weight of polyol (2), polyol (3) and water with the proviso that the composition does not comprise compounds having primary, secondary or tertiary nitrogen atoms. Still further the present invention is concerned with a composition comprising polyol (2), water and a phosphate, the amount of polyol (2) and water being 45–80 and 20–55 parts by weight respectively per 100 parts by weight of polyol (2) and water, the amount of phosphate being 0.025 to 2.5% by weight calculated on the amount of polyol (2) and water with the proviso that the composition does not comprise compounds having primary, secondary or tertiary nitrogen atoms.

The foams according to the present invention have no major glass-rubber transition between −100° C. and +25° C.

In more quantitative terms these foams show a ratio E'$_{-100°\,C.}$/E'$_{+25°\,C.}$ of 1.3 to 15.0, preferably 1.5 to 10 and most preferably of 1.5 to 7.5. The core density of the flexible foams preferably is 3–20 kg/m$^3$ (ISO 845).

In the context of the present application a flexible polyurethane foam is a crushed foam having a ball rebound (measured according to ISO 8307) of at least 40%, preferably at least 50% and most preferably 55–85% in at least one of the three dimensional directions and a sag factor (CLD 65/25) of at least 2.0 (measured according to ISO 3386/1). Preferably such flexible foams have a Young's storage modulus at 25° C. of at most 500 kPa, more preferably at most 350 kPa and most preferably between 10 and 200 kPa (Young's storage modulus measured by DMTA according to ISO/DIS 6721-5). Further, such flexible foams preferably have a sag factor (CLD 65/25) of at least 3.5 and most preferably 4.5–10 (measured according to ISO 3386/1). Still further such flexible foams preferably have a CLD hysteresis loss (ISO 3386/1) of below 55%, more preferably below 50% and most preferably below 45%.

In the context of the present patent application a rigid polyurethane foam is an uncrushed foam having a ball rebound measured in the direction of foam rise of less than 40% (ISO 8307 with the proviso that no preflex conditioning is applied, that onlyone rebound value per sample is measured and that test pieces are conditioned at 23° C.±2° C. and 50±5% relative humidity) and/or having a CLD 65/25 sag factor measured in the direction of foam rise of less than 2.0 (ISO 3386/1 with the proviso that the sag factor is determined after the first load-unload cycle); these properties both being measured at a core density of the foam of 3–15 kg/m$^3$. Preferably the ratio E'$_{-100°\,C.}$/E'$_{+25°\,C.}$ of such a rigid foam is 1.3–15. If in the present application ISO 8307 and ISO 3386/1 are mentioned in relation to rigid foams they refer to the tests as described above including the provisos.

The flexible polyurethane foams according to the present invention are prepared by reacting a polyisocyanate and a polyfunctional isocyanate-reactive polymer under foam forming conditions to prepare a rigid polyurethane foam and by crushing this rigid polyurethane foam. Further the present invention is concerned with the process for preparing such rigid foams and with reaction systems comprising the ingredients for making such foams.

In the context of the present invention the following terms have the following meaning:
1) isocyanate index or NCO index or index:
   the ratio of NCO-groups over isocyanate-reactive hydrogen atoms present in a formulation, given as a percentage:

$$\frac{[NCO] \times 100}{[\text{active hydrogen}]} (\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce modified polyisocyanates (including such isocyanate-derivatives referred to in the art as quasi or semi-prepolymers and prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of the water) present at the actual foaming stage are taken into account.

2) The expression "isocyanate-reactive hydrogen atoms" as used herein for the purpose of calculating the isocyanate index refers to the total of active hydrogen atoms in hydroxyl groups present in the reactive compositions; this means that for the purpose of calculating the isocyanate index at the actual foaming process one hydroxyl group is considered to comprise one reactive hydrogen and one water molecule is considered to comprise two active hydrogens.

3) Reaction system a combination of components wherein the polyisocyanates are kept in one or more containers separate from the isocyanate-reactive components.

4) The expression "polyurethane foam" as used herein refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams) and with polyols as isocyanate-reactive compounds.

5) The term "average nominal hydroxyl functionality" is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

6) The word "average" refers to number average unless indicated otherwise.

Suitable organic polyisocyanates for use in the process of the present invention include any of those known in the art for the preparation of rigid polyurethane foams, like aliphatic, cycloaliphatic, araliphatic and, preferably, aromatic polyisocyanates, such as toluene diisocyanate in the form of its 2,4 and 2,6-isomers and mixtures thereof and diphenylmethane diisocyanate in the form of its 2,4'-, 2,2'- and 4,4'-isomers and mixtures thereof, the mixtures of diphenylmethane diisocyanates (MDI) and oligomers thereof having an isocyanate functionality greater than 2 known in the art as "crude" or polymeric MDI (polymethylene polyphenylene polyisocyanates), the known variants of MDI comprising urethane, allophanate, urea, biuret, carbodiimide, uretonimine and/or isocyanurate groups.

Mixtures of toluene diisocyanate and diphenylmethane diisocyanate and/or polymethylene polyphenylene polyisocyanates may be used. Most preferably polyisocyanates are used which have an average isocyanate functionality of 2.1–3.0 and preferably of 2.2–2.8.

Preferably MDI, crude or polymeric MDI and/or liquid variants thereof are used said variants being obtained by introducing uretonimine and/or carbodiimide groups in said polyisocyanates, such a uretonimine and/or carbodiimide modified polyisocyanate having an NCO value of at least 20% by weight, and/or by reacting such a polyisocyanate with one or more polyols having a hydroxyl functionality of 2–6 and a molecular weight of 62–500 so as to obtain a modified polyisocyanate having an NCO value of at least 20% by weight.

Suitable polyether polyols (2) have been fully described in the prior art and include reaction products of alkylene oxides, for example ethylene oxide and/or propylene oxide, with initiators containing from 2 to 8 active hydrogen atoms per molecule and noprimary, secondary or tertiary nitrogen atoms. Suitable initiators include: polyols, for example ethylene glycol, diethylene glycol, triethylene glycol, propylene glycol, dipropylene glycol, butane diol, glycerol, trimethylolpropane, pentaerythritol, sorbitol and sucrose and mixtures of such initiators. Other suitable polyether polyols (2) include ethylene glycol, diethylene glycol, propylene glycol, dipropylene glycol, butane diol, glycerol, trimethylolpropane and the other initiators mentioned before. Mixtures of such isocyanate-reactive compounds may be used as well. Most preferred polyols (2) are those having an average equivalent weight of 70–300 and preferably of 70–150, having an average nominal hydroxyl functionality of from 2 to 3 and an oxyethylene content of at least 75% by weight. Such a most preferred polyol may contain a polyol having an equivalent weight below 70 while meeting the other criteria as to functionality and oxyethylene content provided the average equivalent weight remains in the 70–300 range. Such most preferred polyols are known as such and commercially available.

Polyether polyols (3) are generally known in the art and include reaction products of alkylene oxides, for example ethylene oxide and/or propylene oxide, with initiators containing from 2 to 6 active hydrogen atoms per molecule and no primary, secondary or tertiary nitrogen atoms. Suitable initiators are ethylene glycol, diethylene glycol, triethylene glycol, propylene glycol, dipropylene glycol, butane diol, glycerol, trimethylolpropane, pentaerythritol, sorbitol and mixtures of such initiators.

Most preferred polyether polyols (3) are those according to formula 1, described hereinbefore. Those having a nominal hydroxyl functionality of 3 may be prepared by ethoxylation of an initiator, followed by propoxylation and again ethoxylation, wherein the initiator is a triol like glycerol and/or trimethylol propane. Those having a nominal hydroxyl functionality of 2 may be prepared by ethoxylation of ethylene glycol, diethylene glycol and/or triethylene glycol, followed by propoxylation and again ethoxylation; or by propoxylation of ethylene glycol, diethyleneglycol and/or triethylene glycol followed by ethoxylation; or by propoxylation of a polyoxyethylene polyol having 4–15 oxyethylene groups followed by ethoxylation. Mixtures of such most preferred polyols may be used as well. Although not necessary other polyols may be used together with these most preferred polyols according to formula 1, provided the amount does not exceed 30% by weight based on the weight of these polyols according to formula 1. Such polyols according to formula 1 are commercially available (e.g. Daltocel F 430 from Imperial Chemical Industries PLC).

In order to prepare a foam water is used as a blowing agent. However if the amount of water is not sufficient to obtain the desired density of the foam any other known way to prepare polyurethane foams may be employed additionally, like the use of reduced or variable pressure, the use of a gas like air, $N_2$ and $CO_2$, the use of more conventional blowing agents like chlorofluorocarbons, hydrofluorocarbons, hydrocarbons and fluorocarbons, the use of other reactive blowing agents, i.e. agents which react with any of the ingredients in the reacting mixture and due to this reaction liberate a gas which causes the mixture to foam and the use of catalysts which enhance a reaction which leads to gas formation like the use of carbodiimide-formation-enhancing catalysts such as phospholene oxides. Combinations of these ways to make foams may be used as well. The amount of blowing agent may vary widely and primarily depends on the desired density. Water may be used as liquid at below-ambient, ambient or elevated temperature and as steam. A preferred combination of blowing agent is water and $CO_2$ wherein the $CO_2$ is added to the ingredients for making the foam in the mixing head of a device for making the foam, to one of the isocyanate-reactive ingredients and preferably to the polyisocyanate before the polyisocyanate is brought into contact with the isocyanate-reactive ingredients.

If a cyclic polyisocyanate and more in particular an aromatic polyisocyanate and most in particular an MDI or polymethylene polyphenylene polyisocyanate is used the content of cyclic and more in particular of aromatic residues in the flexible foam is relatively high as compared to conventional flexible polyurethane foams. The foams according to the invention preferably have a content of benzene rings, derived from aromatic polyisocyanates, which is 30 to 56 and most preferably 35 to 50% by weight based on the weight of the foam. Since polyols, polymer polyols, fire retardants, chain extenders and/or fillers which contain benzene rings may be used, the overall benzene ring content of the flexible foam may be higher and preferably ranges from 30 to 70 and most preferably from 35 to 65% weight as measured by calibrated Fourier Transform Infra Red Analysis.

In addition to the polyisocyanate, the isocyanate-reactive compounds and the blowing agent, one or more auxiliaries or additives known per se for the production of polyurethane foams may be used provided they do not contain primary, secondary or tertiary nitrogen atoms. Such optional auxiliaries or additives include foam-stabilizing agents or surfactants, for example siloxane-oxyalkylene copolymers and polyoxyethylene polyoxypropylene block copolymers, urethane/urea catalysts, for example tin compounds such as dibutyltin dilaurate and in particular stannous octoate and/or phosphates like $NaH_2PO_4$ and $Na_2HPO_4$, and fire retardants, for example halogenated alkyl phosphates such as tris chloropropyl phosphate, anti-oxidants like tertiary nonyl phenols, anti-static agents, UV stabilisers, anti-microbial and anti-fungal compounds and fillers like latex, TPU, silicates, barium and calcium sulphates, chalk and glass fibers or beads.

It is preferred to use a catalyst enhancing the formation of urethane and/or urea groups and in particular to use stannous octoate optionally together with other catalysts. The amount of catalyst may range from 0.1 to 5 and preferably from 0.1 to 3% by weight calculated on the weight of all ingredients used to make the foam; the amount of stannous octoate may range from 0.1 to 3 and preferably 0.1 to 2% by weight calculated on the same basis.

In operating the process for making rigid foams according to the invention, the known one-shot, prepolymer or semi-prepolymer techniques may be used together with conventional mixing methods and the rigid foam may be produced in the form of slabstock, mouldings including foam in fabric and pour-in-place applications, sprayed foam, frothed foam or laminates with other materials such as hardboard, plasterboard, plastics, paper or metal or with other foam layers.

It is convenient in many applications to provide the components for polyurethane production in pre-blended formulations based on each of the primary polyisocyanate and isocyanate-reactive components. In particular, an isocyanate-reactive composition may be used which contains the auxiliaries, additives and the blowing agent in addition to the isocyanate-reactive compounds (2) and (3) in the form of a solution, an emulsion or dispersion. The isocyanate-reactive components may also be supplied independently to the polyisocyanate as two or more compositions containing the additives and auxiliaries; e.g. one composition comprising water and polyol (2) and another composition comprising polyol (3), catalyst and antioxidant may be fed from different storage tanks into the mixing head of a device for making foam, in which mixing head they are mixed with the polyisocyanate.

The rigid foam is prepared by allowing the aforementioned ingredients to react and foam until the foam does not rise any more. After rise curing of the foam may be continued as long as desirable. In general a curing period of 1 minute to 24 hours and preferably of 5 minutes to 12 hours will be sufficient. If desired curing may be conducted at elevated temperature. Subsequently the foam may be crushed. It is however preferred to allow the rigid foam obtained to cool down to below 80° C. prior to crushing. The rigid foam (i.e. before crushing) preferably has a core density of 3–15 kg/m$^3$ (ISO 845).

The rigid foam (i.e. before crushing) prepared has a substantial amount of open cells. Preferably the cells of the rigid foam are predominantly open. The crushing may be conducted in any known manner and by any known means. The crushing may for instance be conducted by applying mechanical force onto the foam by means of a flat or pre-shaped surface or by applying variations of external pressure.

In most cases a mechanical force sufficient to decrease the dimension of the foam in the direction of the crushing by 1–90%, preferably by 50–90% will be appropriate. If desired crushing may be repeated and/or carried out in different directions of the foam. Due to the crushing the ball rebound increases considerably in the direction of the crushing. Due to the crushing the density of the foam may increase. In most cases this increase will not exceed 30% of the density before crushing.

The foam may be crushed in the direction of foam rise. A special foam is obtained when the crushing is conducted in a direction perpendicular to the direction of foam rise : then a foam is obtained with a highly anisotropic cell structure.

Although it is difficult to give more precise directions for the crushing since it will inter alia depend on the density of the foam, the rigidity of the foam, the type of crushing device used, we believe those skilled in the art are sufficiently aware of the phenomenon of crushing of polyurethane foams that they will be able to determine the appropriate crushing manner and means with the above guidance, certainly in the light of the following examples.

After the crushing the foam may be subjected to a heat treatment in order to reduce the density increase caused by the crushing. This heat treatment is conducted at 70–200° C. and preferably at 90–180° C. for 0.5 minute to 8 hours and preferably for 1 minute to 4 hours.

By crushing the ball rebound is increased at least in the direction of crushing. The increase is at least 10%. After the crushing and optionally the heating a novel flexible foam is obtained which has exceptional properties. Despite the fact that the foam is flexible, it does not show a significant change of the Young's storage modulus E' over a temperature range from –100° C. to +25° C., as described before. The oxygen index of the foam prepared from aromatic polyisocyanates preferably is above 20 (ASTM 2863). Further it shows a Young's storage modulus at 25° C. of at most 500 kPa, preferably at most 350 kPa, most preferably between 10–200 kPa and a sag factor (CLD 65/25, ISO 3386/1) of at least 2.0, preferably at least 3.5 and most preferably of 4.5–10. CLD hysteresis loss values for the foams are below 55% and preferably below 50% (which is calculated by the formula $$\frac{(A-B)}{A} \times 100\%,$$

wherein A and B stand for the area under the stress/strain curve of the loading (A) and unloading (B) as measured according to ISO 3386/1). Still further these foams can be manufactured with a very low or even negative Poisson's ratio as determined by lateral extension studies under compression of the foams. Finally compression set values of the foams are generally low, preferably below 40% (ISO 1856 Method A, normal procedure).

If the $Tg^h$ is not too high the foam might be used in thermoforming processes to prepare shaped articles. Preferably the $Tg^h$ of the foam is between 80 and 180° C., most preferably between 80° C. and 160° C. for such thermoforming applications. Further it was found that foams, which have been made by using a relatively low amount of the polyols having a low molecular weight, show a small or non-visible $Tg^h$ (the modulus change at $Tg^h$ is small or the modulus changes gradually until the foam thermally decomposes)by DMTA; such foams may be used for thermoforming activities as well.

Further the foams show good load-bearing properties like compression hardness values without the use of external fillers together with a good resilience, tear strength and durability (fatigue resistance) even at very low densities. In conventional flexible foams often high amounts of filler need to be used to obtain satisfactory load-bearing properties. Such high amounts of fillers hamper the processing due to a viscosity increase.

The foams of the present invention may be used as cushioning material in furniture and automotive and aircraft seating and in mattresses, as carpet backing, as hydrophilic foam in diapers, as packaging foam, as foams for sound insulation in automotive applications and for vibration isolation in general. The foam according to the present invention further may be used together with other, conventional flexible foams to form composites, like e.g. in mouldings; such composites may also be made by allowing the ingredients for making the conventional flexible foam to form said foam in a mould in the presence of the foam according to the present invention or alternatively by allowing the ingredients for making the rigid foam according to the present invention to form said rigid foam in a mould in the presence of the conventional flexible foam followed by crushing the moulding so obtained. Further the foams according to the present invention may be used as textile cover, as cover for other type of sheets, as carpet underlay or felt-replacement; the so-called flame lamination technique may be applied to adhere the foam to the textile, the carpet or the other sheet. In this respect it is important to note that the foam according to the present invention is suitable to be cut in sheets of limited thickness, e.g. of about 1 cm and less. Still further the foam according to the present invention may be used as insulation material around pipes and containers.

The invention is illustrated by the following examples.

EXAMPLE 1

(Comparative)

A polyisocyanate mixture was prepared by mixing 56.6 parts by weight of polymeric MDI having an NCO value of 30.7% by weight and an isocyanate functionality of 2.7 and 43.4 parts by weight of a uretonimine modified MDI having an NCO value of 31% by weight, an isocyanate functionality of 2.09, a uretonimine content of 17% by weight and 2,4'-MDI content of 20% by weight. An isocyanate-reactive composition was prepared by mixing 32.2 parts by weight (pbw) of polyethylene glycol having a molecular weight of 200, 4.5 pbw of ethylene glycol, 42.6 pbw of an EO/PO polyol having a nominal functionality of 2, diethylene glycol as initiator, an EO content (except the initiator) of 20.2% by weight (all tipped) and a hydroxyl value of 30 mg KOH/g, 5.5 pbw of diethanolamine, 14.5 pbw of water and 0.7 pbw of di-butyl-tin-dilaurate. This composition was an emulsion. 106.1 pbw of the polyisocyanate mixture and 46.9 pbw of the isocyanate-reactive composition (isocyanate index 75.5) were mixed for 13 seconds using a Heidolph ™ mechanical mixer at a speed of 5000 rounds per minute (rpm). After mixing the reaction mixture was poured in an open 5 liter bucket and allowed to react. Prior to the pouring of the reaction mixture into the bucket, the inner walls of the bucket were greased with release agent Desmotrol™ D-10RT. 2½ minutes after the foam has stopped rising (foam rise time 70 seconds) the foam was taken out of the bucket and allowed to cool to ambient temperature. A rigid polyurethane foam was obtained. Core foam samples were then cut out of the centre of the foam for property evaluation. The core density was 11 kg/m³ (ISO 845). When this experiment was repeated on a Komet high pressure, multiple stream dispensing machine using in total 3kg of material the rigid foam showed excessive thermal degradation.

EXAMPLE 2

(Comparative)

Three isocyanate reactive blends (blend A, B and C) were prepared. Blend A was prepared by mixing 200 pbw of the EO/PO polyol of example 1 and 6.5 pbw of 'DABCO' T9 (catalyst from AIR PRODUCTS, DABCO is a trade mark). Blend B was prepared by mixing 75.5 pbw of polyethylene glycol with a molecular weight of 200 and 5.56 pbw of 'IRGANOX' 5057 (a substituted diphenyl amine antioxydant from Ciba-Geigy Ltd., IRGANOX is a trademark). Blend C was prepared by mixing 23.5 pbw of triethylene glycol, 40.0 pbw of water and 0.6 pbw of monobasic sodium phosphate. 166.1 g of blend A, 65.2 g of blend B, 51.6 g of blend C and 617.1 g of the isocyanate blend of example 1 (isocyanate index 100) were mixed for 13 seconds using an 'Ytron' (trademark) mechanical mixer at a speed of 3500 rpm. After mixing the reaction mixture was poured in an open 50×50×30 cm³ wooden mould. Prior to pouring the mixture in the wooden mould, the inner walls were covered with paper. One hour after the foam had stopped rising (foam rise time 70 seconds) the foam was taken out of the mould and allowed to cool to ambient temperature. The rigid foam was cut as in example 1. The core density was 13 kg/m³ (ISO 845). The rigid foam showed no visable discoloration and the amount of extractables was 7.3% by weight. This experiment was repeated on a Komet high pressure, four stream dispensing machine with a slightly different isocyanate blend but for the rest the same. To that aim four blends called blend D, E, F and G were prepared. Blend D was prepared by mixing 58.2 kg of the EO/PO polyol of example 1 and 1.88 kg of IRGANOX 5057. Blend E was prepared by mixing 6792 g of the EO/PO polyol of example 1 and 2208 g of DABCO T9. Blend F was prepared by mixing 4868 g of polyethylene glycol with a molecular weight of 200, 1515 g of triethylene glycol, 2579 g of water and 39 g of monobasic sodium phosphate. Blend G was prepared by mixing 60.0 kg of the polymeric MDI of example 1 and 51.9 kg of the uretonimine modified isocyanate of example 1. The dispenser was set such that stream D, E, F and G were mixed in weight ratios of 18.56 to 2.65 to 13.96 to 76.70, respectively, and 3 kg of foam was prepared in an open, paper lined 50×100×30cm³ wooden mould. The isocyanate index amounted to 100. The rigid foam had a core density of 13 kg/m³ (ISO 845) and an amount of extractables of 12.4% by weight. Furthermore the core of the foam showed some discoloration.

Determination of Extractables of a Foam

The amount of extractables is determined by a continuous extraction using a soxlet apparatus and methanol as a solvent. The equipment consists of a 500 ml pear-shaped flask, the soxlet apparatus and aDimroth cooler. A foam sample of 3 to 4 g is cut into pieces of approximately 0.3 cm³, brought into an extraction thimble and mounted in the soxlet apparatus. The extraction is performed with 300 ml methanol. The methanol in the flask is heated by means of an oilbath which is set at a temperature of 140° C. After refluxing for 3 hours, the methanol is removed from the filtrate by using a rotavapor. Subsequently the weight of the residue in the flask is determined. The amount of extractables is expressed as weight % calculated from the amount of extracted material and the weight of the extracted foam sample.

EXAMPLE 3

(Comparative)

Two isocyanate reactive blends (blend A and B) were prepared. Blend A was prepared by mixing 30 pbw of the EO/PO polyol of example 1, 0.3 pbw of 'DABCO' T9 and 0.3 pbw of 1-methyl-1-oxo-phospholene (a carbodiimide catalyst from Hoechst). Blend B was prepared by mixing 11.3 pbw of polyethylene glycol with a molecular weight of 200, 1.95 pbw of diethanolamine, 1.58 pbw of ethylene glycol and 4.5 pbw of water. 26.9 g of blend A, 17.3 g of blend B and 108.6 g of the isocyanate blend of example 1 (isocyanate index 123) were mixed for 13 seconds with a 'Heidolph' mechanical mixer at a speed of 5000 rpm. After mixing the reaction mixture was poured in an open 5 liter bucket and allowed to react. One hour after the foam has stopped rising (foam rise time 70 seconds) the foam was taken out of the bucket and allowed to cool to ambient temperature. A rigid polyurethane foam was obtained with a core density of 16 kg/m³ (ISO 845). Attenuated total reflection Fourier transform infra red analysis showed the presence of carbodiimide groups (signal at 2140 cm$^{-1}$).

The core of the foam did not show signs of visible discoloration. When this experiment was repeated with 1.3 kg of material using the YTRON mixer and mixing conditions and the paper lined wooden mould dimensions of 50×50×30 cm³ of example 2 a rigid foam with a core density of 13.8 kg/m³ was obtained which foam showed visible discoloration in the centre of the bun.

EXAMPLE 4

In this example blend D from example 2 was substituted for blend H which was prepared by mixing 58.2 kg of the EO/PO polyol of example 1 and 1.88 kg IRGANOX 1010 (a sterically hindered phenol antioxidant from Ciba-Geigy Ltd., IRGANOX is a trade name). The dispenser was set such that stream H, E, F and G were mixed in weight ratios of 18.56 to 2.65 to 13.96 to 76.70, respectively, and 3 kg of foam was prepared in an open, paper lined 50×100×30 cm³ wooden mould. The isocyanate index amounted to 100. The rigid foam had a core density of 12.7 kg/m³ (ISO 845) and an amount of extractables of 11.6% by weight. The core of the foams showed no discoloration. The weight ratio of stream G was increased to 78.2, 79.8 and 81.3 to produce foams with an isocyanate index of 102, 104 and 106 respectively. The rigid foams had a core density of 13.3, 12.3 and 13.4 kg/m³, respectively (ISO 845) and the amount of extractables amounted to 7.4, 1.5 and 3.4 weight % respectively. None of these foams showed discoloration. The foams with an isocyanate index of 102, 104 and 106 were crushed by one compression (70% CLD) at 100 mm/min in the rise direction, followed by 15 crushings (70% CLD of the height after the first compression) at a rate of 500 mm/min in the rise direction of the foam using an INSTRON (INSTRON is a trade mark) mechanical tester mounted with flat plates. After crushing a flexible foam was obtained having no major glass-rubber transition between –100° C. and +25° C. and having the following properties:

| | | | |
|---|---|---|---|
| isocyanate index | 102 | 104 | 106 |
| core density after crushing (ISO 845, kg/m³) | 14.7 | 13.3 | 16.8 |
| Young's storage modulus ratio (E'$_{-100°C}$/E$_{+25°C}$) (ISO/DIS 6721-5) | 2.7 | 2.5 | 2.5 |
| Young's storage modulus at 25° C. (kPa) (ISO/DIS 6721-5) | 215 | 166 | 192 |
| benzene content, % by weight (calculated) | 43.4 | 44.1 | 45.2 |
| ball rebound (%, ISO 8307) | 53 | 55 | 53 |
| CLD-40% (kPa, ISO 3386/1) | 5.5 | 5.6 | 7.5 |
| SAG factor (CLD 65/25, ISO 3386/1) | 5.7 | 4.8 | 8.6 |

What is claimed is:

1. A polyol composition comprising, relative to the total weight of components (A), (B) and (C);
   (A) 15–40 parts by weight of a polyether polyol (2) having an average equivalent weight of 70–300, an average nominal hydroxyl functionality of from 2 to 6 and an oxyethylene content of at least 75% by weight,
   (B) 45–75 parts by weight of a polyether polyol (3) having an average equivalent weight of 1000–3000, an average hydroxyl functionality of 2–3, a hydroxyl number of from 10 to less than 150 mg KOH/g and is represented by the following structure:

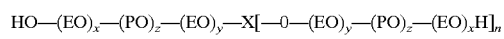

wherein
   EO represents an ethylene oxide radical,
   PO represents a propylene oxide radical,
   x represents a number from 1 to 15,
   y represents a number from 0 to 6,
   z represents a value so as to arrive at the above equivalent weight,
   n is 1–2 and
   X is a hydrocarbon radical having 2–10 carbon atoms or a radical represented by the formula

(C) 5–20 parts by weight water with the proviso that the composition does not comprise compounds having primary, secondary or tertiary nitrogen atoms.

2. The polyol composition according to claim 1, wherein polyol (2) has an average equivalent weight of 70–150 and an average nominal hydroxyl functionality of from 2 to 3.

3. The polyol composition according to claim 1 wherein the nominal hydroxyl functionality is 2, x=3–10, y=1–4, n=1 and X is a hydrocarbon radical having 2–6 carbon atoms or a radical having the formula —CH$_2$—CH$_2$—(O—CH$_2$—CH$_2$)$_{1-2}$—.

4. The polyol composition according to claim 2 wherein the nominal hydroxyl functionality is 2, x=3–10, y–1=4, n=1 and X is a hydrocarbon radical having 2–6 carbon atoms or a radical having the formula —$CH_2$—$CH_2$—(O—$CH_2$—$CH_2$)$_{1-2}$—.

5. The polyol composition according to claim 1 wherein a catalyst enhancing the formation of urethane and/or urea groups is present in an amount of 0.1 to 5% by weight calculated on the weight of all ingredients used to make the foam.

6. The polyol composition according to claim 5 wherein stannous octoate is present as catalyst in an amount of 0.1 to 3% by weight calculated on the weight of all ingredients used to make the foam.

7. The polyol composition according to claim 2 wherein a catalyst enhancing the formation of urethane and/or urea groups is present in an amount of 0.1 to 5% by weight calculated on the weight of all ingredients used to make the foam.

8. The polyol composition according to claim 7 wherein stannous octoate is present as catalyst in an amount of 0.1 to 3% by weight calculated on the weight of all ingredients used to make the foam.

9. The polyol composition according to claim 1 wherein a catalyst enhancing the formation of urethane and/or urea groups is present in an amount of 0.1 to 5% by weight calculated on the weight of all ingredients used to make the foam.

10. The polyol composition according to claim 9 wherein stannous octoate is present as catalyst in an amount of 0.1 to 3% by weight calculated on the weight of all ingredients used to make the foam.

11. The polyol composition according to claim 2 wherein a catalyst enhancing the formation of urethane and/or urea groups is present in an amount of 0.1 to 5% by weight calculated on the weight of all ingredients used to make the foam.

12. The polyol composition according to claim 11 wherein stannous octoate is present as catalyst in an amount of 0.1 to 3% by weight calculated on the weight of all ingredients used to make the foam.

13. The polyol composition according to claim 4 wherein a catalyst enhancing the formation of urethane and/or urea groups is present in an amount of 0.1 to 5% by weight calculated on the weight of all ingredients used to make the foam.

14. The polyol composition according to claim 13 wherein stannous octoate is present as catalyst in an amount of 0.1 to 3% by weight calculated on the weight of all ingredients used to make the foam.

* * * * *